United States Patent [19]

Chen et al.

[11] Patent Number: 4,632,818

[45] Date of Patent: Dec. 30, 1986

[54] PRODUCTION OF SULFUR FROM AN OXYGEN ENRICHED CLAUS SYSTEM

[75] Inventors: Michael S. K. Chen, Zionsville; W. Patrick Hegarty, Allentown, both of Pa.; Dipak J. Sampat, Aurora, Colo.

[73] Assignee: Air Products and Chemicals, Inc., Allentown, Pa.

[21] Appl. No.: 789,687

[22] Filed: Oct. 21, 1985

Related U.S. Application Data

[63] Continuation-in-part of Ser. No. 657,322, Oct. 3, 1984, abandoned.

[51] Int. Cl.[4] .................. C01B 17/04; F23L 7/00; G05D 23/13
[52] U.S. Cl. ..................... 423/574 R; 423/573 R; 110/348; 236/12.14
[58] Field of Search .................. 423/567, 575, 573 R, 423/574 R, 574 G, 576, 542; 110/348, 190; 236/12.1, 12.14; 422/160

[56] References Cited

U.S. PATENT DOCUMENTS

| | | |
|---|---|---|
| 3,399,970 | 9/1968 | Gretiel et al. .................. 422/160 |
| 3,447,903 | 6/1969 | Wiewiorowski ............... 423/567 |
| 3,661,534 | 5/1972 | Reed ............................... 422/166 |
| 3,822,341 | 7/1974 | Smith ............................. 423/574 |
| 3,873,679 | 3/1975 | Berry et al. ................... 423/574 G |
| 4,153,674 | 5/1979 | Verloop et al. .............. 423/573 R |
| 4,279,882 | 7/1981 | Beavon ........................ 423/574 R |
| 4,302,434 | 11/1981 | Hellmer et al. ............ 423/573 G |
| 4,481,181 | 11/1984 | Norman ..................... 423/573 G |
| 4,552,747 | 11/1985 | Goar ............................ 423/574 R |

OTHER PUBLICATIONS

*Why Recover Sulfur from H2S?*—Oil & Gas Journal article, Oct. 28, 1968, p. 88+ by J. W. Kilmer, H. Grekel & J. W. Palm.

*Oxygen Use in Claus Sulfur Plants*, 1981, Gas Conditioning Conference Report, by M. R. Gray & W. Y. Svrcek.

*Claus Plant Oxygen Enrichment*—by Linde of Union Carbide, 1983.

*Sulfur from Hydrogen Sulfide*—Chemical Engineering Progress, vol. 49, No. 4, p. 203+, by B. W. Gamson & R. H. Elkins.

*Computer Design and Simulation of Sulphur Plants*—4 Parts—Canadian Gas Journal, Gas Processing/Canada, by R. S. Lees and J. T. Ryan Jul.–Aug. 1970, p. 38 Sep.–Oct., 1970, p. 32, Jan.–Feb. 1971, p. 12, and Jul.–Aug. 1971, p. 16.

*Primary Examiner*—Gregory A. Heller
*Attorney, Agent, or Firm*—Geoffrey L. Chase; E. Eugene Innis; James C. Simmons

[57] ABSTRACT

A process and system are set forth for improving the recovery of sulfur from an oxygen-enriched Claus process by introducing a liquid sulfur stream into the reaction furnace zone to moderate oxygen-induced high temperatures which allow oxygen-enrichment and attendant throughput in the Claus process to higher levels than heretobefore practiced and alternatively to quench the reaction furnace effluent to maintain a hydrogen sulfide dioxide ratio of 2:1.

13 Claims, 3 Drawing Figures

PRODUCTION OF SULFUR FROM AN OXYGEN ENRICHED CLAUS SYSTEM

TECHNICAL FIELD

The present invention is a continuation-in-part of U.S. application Ser. No. 657,322 filed Oct. 3, 1984, now abandoned.

The present invention is directed to the recovery of sulfur from hydrogen sulfide-containing gas streams. More specifically, the present inventon is directed to an improved method of temperature moderation in a Claus sulfur plant using oxygen-enrichment to increase its capacity, wherein the temperature moderation is achieved by the introduction of elemental sulfur into the Claus reaction zone as a temperature moderant or reaction effluent quench.

BACKGROUND OF THE PRIOR ART

The recovery of elemental sulfur from hydrogen sulfide-containing gas streams is known in the prior art as disclosed in the article "Fundamentals of Sulfur Recovered by the Claus Process" by B. Gene Goar, published in the 1977 Gas Conditioning Conference Report.

In a series of four articles published in the Canadian Gas Journal, Gas Processing/Canada, July–August 1970, p. 38, September–October 1970, p. 32, January–February 1971, p. 12 and July–August 1971, p. 16, titled. "Computer Design and Simulation of Sulfur Plants", R. S. Lees and J. T. Ryan describe the kinetics typical of Caus processes with emphasis on reaction furnace operation and reverse reactions that occur upon cooling in a waste heat boiler.

Oxygen-enrichment in the operation of a Claus sulfur plant to increase the capacity of hydrogen sulfide treated in such a plant has also been disclosed in the article "Oxygen Use in Claus Sulfur Plants" by M. R. Gray and W. Y. Svrcek, published in the 1981 Gas Conditioning Conference Report. It was disclosed more specifically that oxygen can be added to the air feed to the burner of a reaction furnace in a Claus sulfur plant to increase the amount of hydrogen sulfide which is combusted to sulfur dioxide for later catalytic conversion to elemental liquid sulfur product. The maximum capacity increase which can be achieved with oxygen-enrichment is determined by the pressure drop through the plant, the reactor space velocity and temperatures of the reaction furnace and the various catalytic zones, particularly the refractory materials used in the furnace of the Claus plant.

In the 1983 publication by Linde of Union Carbide entitled "Claus Plant Oxygen Enrichment", it is noted that oxygen-enrichment limitations exist for rich hydrogen sulfide streams due to temperature limits in the furnace or waste heat boiler of the Claus plant.

U.S. Pat. No. 3,822,341 discloses a Claus plant which uses oxygen-enrichment. One source of the oxygen is initially used to strip residual $SO_2$ from a sidestream in vessel 92, before the oxygen stream in line 96 is optionally recycled with the oxygen in line 12 going to the combustion zone of the waste heat boiler 8, as recited at col. 5, lines 65–68 of the specification. Because the oxygen content of such a stream is completely consumed in the exothermc reaction, this stream cannot be utilized as a moderating medium for flame temperature of the reaction furnace. As described by the Goar article above, Claus sulfur plants typically have an adiabatic reaction furnace followed by a waste heat boiler. The excessive temperature problem with oxygen-enriched operation occurs in the adiabatic reaction furnace. U.S. Pat. No. 3,822,341 ignores the existence of this problem.

U.S. Pat. No. 4,153,674 discloses a Claus plant and tail gas clean up plant wherein a gas stream in line 20 is removed from a tail gas system and is returned or recycled to the front end of the Claus plant 7. This patent does not consider oxygen-enrichment or flame temperature moderation by a recycle stream. Also, a tail gas is reacted to convert all sulfur to hydrogen sulfide, which is absorbed, stripped and returned to the Claus plant.

U.S. Pat. No. 4,279,882 discloses a sulfur recovery process which uses only a series of catalytic reaction beds rather than a combustion reaction furnace, as in the traditional Claus plant. A temperature modifying recycle stream is set forth in the patent, wherein stream 26 is returned to the feed in order to control the temperature in the catalytic reaction zones. This process is economical only for dilute hydrogen sulfide feed gas applications. It also requires a recycle blower operating at high temperature.

It is also known to recycle liquid sulfur product from a Claus plant to the reaction furnace of a Claus plant when processing dilute feed gas streams to such a Claus plant. In an article by H. Grekel, J. W. Palm and J. W. Kilmer in the Oil and Gas Journal. Oct. 28, 1968, page 88+, a scheme is set forth in FIG. 1 of the article to process a feed of 2–15% hydrogen sulfide. Below 15 vol %, Claus reaction furnace flame temperatures are too low for stable operation. Grekel, et al. burn one third of the Claus product sulfur to provide additional sulfur dioxide, such burning taking place in the reaction furnace with air. Some feed is also introduced to the furnace to moderate the temperatures of combustion. The resulting sulfur dioxide is used for the conversion of the predominant amount of the dilute feed entering the catalytic reaction zone wherein the net sulfur product is produced. This process approach is limited to dilute hydrogen sulfide feed applications. Oxygen use is not involved.

In the article "Sulfur From Hydrogen Sulfide" by B. W. Gamson and R. H. Elkins in Chemical Engineering Progress, Vol. 49, No. 4, at page 203 (1953) a Claus process is disclosed. In FIG. 18, the recycle of sulfur from a liquid sulfur pit of a Claus plant is indicated wherein the sulfur is returned to a sulfur burner in order to produce sulfur dioxide using air. The sulfur dioxide is cooled prior to being mixed with a dilute hydrogen sulfide stream prior to catalytic conversion of the hydrogen sulfide and sulfur dioxide to liquid sulfur. Again, this disclosure recycles sulfur and burns it to sulfur dioxide to process a dilute acid gas feed stream and not to avoid excessively high temperatures. There is no disclosure of using oxygen enrichment with such a recycle.

U.S. Pat. No. 4,302,434 discloses a process for producing hydrogen and sulfur from a hydrogen sulfide feed wherein the hydrogen sulfide feed is predominantly cracked at high temperatures rather than combusted with an oxidant gas. At least some hydrogen sulfide can be burned in addition to that being cracked. The cracked hydrogen sulfide components of hydrogen and sulfur are quickly cooled by indirect heat exchange to below 1500° F. in a waste heat boiler in order to avoid the recombination of the cracked components to hydrogen sulfide. After condensing and removing liquid sulfur, residual sulfur compounds are rehydrogenated to hydrogen sulfide for solvent removal to provide a hydrogen rich final product process. Essentially no sulfur dioxide is produced in the process and no catalytic Claus conversion steps requiring a 2:1 $H_2S:SO_2$ ratio for efficient conversion to sulfur are involved.

In U.S. Pat. No. 4,481,181 a process is set forth for production of hydrogen from hydrogen sulfide wherein hydrogen sulfide is combusted with oxygen to accomplish partial oxidation of the hydrogen sulfide with less than stoichiometric quantities of oxygen and the partial oxidation product is quenched with a cooler recycle gas stream to prevent recombination of hydrogen and sulfur. The feed hydrogen sulfide is preheated to the maximum temperature practical (1150° K.) to obtain the high temperature (1400° K.) necessary for substantial endothermic, equilibrium cracking of hydrogen sulfide to hydrogen and sulfur vapor. while minimizing the input oxygen required to combust part of the hydrogen formed to provide the heat required for the endothermic cracking reaction. Under these conditions, as set forth in the example, the overall reactions to equilibrium are:

At these conditions, substantially no sulfur dioxide is produced and the effluent gas does not have the 2:1 $H_2S:SO_2$ mole ratio necessary for efficient conversion to sulfur in the typical catalytic Claus conversion process steps. Hydrogen is recovered from the quench cooled effluent gases after removal of a recycle stream to perform the quench.

The present invention overcomes the shortcomings of the prior art by increasing throughput of a Claus plant with oxygen-enrichment to an extent beyond that considered feasible in the prior art because of flame temperature limitations. In addition. the present invention provides better throughput of reaction components through the Claus plant reaction train by reducing the carryover of inerts through the system. This is achieved by injecting elemental sulfur or recycling elemental sulfur into the reaction furnace of the Claus plant from the product sulfur produced in the overall Claus plant. The sulfur injection decreases pressure drop in the downstream portion of the Claus plant which pressure drop would have been increased with other injectants, such as water.

BRIEF SUMMARY OF THE INVENTION

The present invention is directed to a process for recovering sulfur from a feed gas stream rich in hydrogen sulfide, wherein the gas stream is partially combusted with an oxygen-enriched gas in a Claus reaction furnace zone, the combustion effluent is cooled with the attendant condensation and separation of sulfur in a first condensation zone and the remaining effluent stream is typically passed through at least one stage of reheating, conversion in a catalytic Claus reaction zone and cooling with attendant condensation and separation of sulfur in an additional condensation, wherein the improvement comprises introducing elemental sulfur into the reaction furnace zone to moderate the temperature of the reaction furnace zone or to quench the reaction furnace effluents so as to freeze reaction products.

Typically, the process uses three stages of reheating, conversion and cooling and separation subsequent to the first condensation zone.

The process is relevant for feed gas hydrogen sulfide contents of 60 or greater mole percent.

Preferably the oxygen enrichment of the reaction furnace is in the range of 32 to 100 mole %. More preferably, the enrichment is 40–75 mole %. The recycle sulfur injection can be in the range of 0.8 to 1.3 moles of sulfur (as $S_2$) per mole of enriching oxygen fed to the burner of the reaction furnace.

Preferably the temperature of the reaction furnace zone is maintained in the range of 2400° to 2800° F.

In an alternative embodiment the present invention is directed to a process for recovering sulfur from a feed stream having a hydrogen sulfide content of 60% or greater in a combined oxygen enriched Claus combustion and Claus catalytic conversion, optionally without the recovery of a hydrogen product, comprising the steps of combusting the hydrogen sulfide feed gas with an oxygen enriched gas in a combustion zone, wherein the hydrogen sulfide/oxygen volume ratio is in the range of 1.9:1 to 2.9:1 and the temperature of the combustion zone is in the range of 1800° to 2700° F., to produce a combustion zone effluent with a hydrogen sulfide/sulfur dioxide ratio n the range of 1.95:1 to 2.05:1, rapidly direct quenching the combustion zone effluent to cool said effluent to a temperature in the range of 1000° to 1700° F. to inhibit the reformation of hydrogen sulfide and to maintain the hydrogen sulfide/sulfur dioxide ratio of the combustion effluent by introducing a stream of fluid sulfur into said effluent at the inlet of a waste heat boiler, indirectly heat exchanging the combustion effluent against a cooling fluid to further reduce the temperature of the combustion effluent in a waste heat boiler, condensing liquid sulfur and recovering the same from the combustion effluent in a first condensation zone by further cooling the combustion effluent to the condensation temperature of sulfur against a cooling fluid, passing the remaining combustion effluent through at least one stage of heating, conversion in a catalytic Claus reaction zone and cooling with attendant condensation and recovery of sulfur and treating the residual combustion effluent in a tailgas cleanup unit to provide an environmentally acceptable vent stream having a hydrogen sulfide content of less than 2 vol %.

Preferably the hydrogen sulfide/oxygen ratio is approximately 2.5:1. but would decrease if the feed gas contains hydrocarbons.

Optimally the hydrogen sulfide to sulfur dioxide ratio is 2.

Preferably the combustion zone temperature is approximately 2400° F. while the combustion zone effluent is quenched to a temperature of approximately 1400° F.

The preferred liquid sulfur quench fluid is added to the combustion zone effluent in a ratio of approximately 17 lbs./lb. mole of effluent.

Preferably the liquid sulfur quench stream is added to the combustion zone effluent downstream of the combustion zone and immediately upstream of the waste heat boiler of the overall process.

Optimally, the injected fluid sulfur is in liquid form. Alternately, the dispersion of sulfur may be pulverized solid sulfur suspended in a carrier gas.

DETAILED DESCRIPTION OF THE INVENTION

Claus sulfur recovery systems are widely utilized to recover sulfur from acid gas streams produced in natural gas purification and in petroleum refineries, primarily from amine sweetening. In refineries, the hydrogen sulfide is in crude oil and is contained in hydrocarbon desulfurization unit off gases and fluidized catalytic cracker unit off gases. Often times, gas streams produced in the amine unit are quite rich in hydrogen sulfide, particularly in petroleum refineries, where it may be in the range of 80 to 90 mole % hydrogen sulfide. In many refineries, the Claus plant units are either fully loaded or subject to becoming fully loaded (capacity limited) due to the processing of heavier crude oils, which contain increasingly larger amounts of sulfur compounds. With the dwindling known reserves of refinable sweet hydrocarbons and crude oils, less attractive known sour oil reserves are now being processed which typically have higher sulfur content. This trend toward refining of such higher sulfur containing hydrocarbon feeds will increase in the future and will create capacity limitations on Claus plants presently in existence. Therefore. a method for increasing the capacity of the Claus plant to process sulfur, while maintaining the temperature limitations of the materials of the Claus plant, is needed.

As Claus sulfur recovery unit feed rates are increased above capacity, several problems develop. At increased flow, the pressure drop through the Claus plant and tailgas clean-up unit increases and the back pressure increases require hydrogen sulfide and air feed at pressures beyond what is available from the equipment that supplies the hydrogen sulfide feed and the air blower that provides feed air. The increased flow also increases the space velocity in the reaction furnace and the catalytic reactor stages. This increase in space velocity reduces sulfur conversion and increases emissions to the tailgas clean-up unit. The increased flow to the tailgas clean-up unit increases its pressure drop and further lowers the tailgas sulfur recovery resulting in increased and usually environmentally unacceptable sulfur emissions. The increased back pressures in some Claus plants pose the risk of blowing liquid sulfur drain seals which would release noxious toxic hydrogen sulfide. Although high pressure sulfur drain seals and increased throughput equipment could be designed to meet the capacity requirements, the reduced sulfur conversion and increased sulfur emissions remain a problem in present day Claus plant operation.

One method which may be used to increase the capacity of an existing Claus plant is the use of oxygen to enrich the airstream to the reaction furnace of the Claus plant from 21 mole % oxygen, which is the content of air. up to 70-90 mole % oxygen or higher, such as 100 mole % oxygen (wherein no air is introduced into the Claus plant). Any increase in oxygen content of the airstream effectively reduces the nitrogen content of gases passing through the Claus plant and increases its throughput capacity for sulfur by diminishing the gas flow of inerts, namely nitrogen which must also be passed through the flow train of the Claus plant. Typically, the capacity of the Claus plant which is handling 80-90 mole % hydrogen sulfide with a typical concentration of hydrocarbons can be increased 10-15% by enriching the air with oxygen. Any further addition of oxygen will cause the flame temperature limitations of the firebrick and refractory in the reaction furnace to be exceeded.

If the acid gas stream contains 90 mole % hydrogen sulfide and the Claus plant is performing a typical burn of only one third of the hydrogen sulfide (one third of the fully stoichiometric air requirements) and the burner is receiving air (21 mole % oxygen), then the theoretical adiabatic flame temperature should be about 2400° F. and the reaction furnace outlet temperature is about 2200° F. Note that as described in the Goar article, the theoretical flame temperature is typically higher than the reaction furnace outlet temperature, because, as subsequently described, the endothermic Claus reaction proceeds in the reaction furnace and cools the flame products. If the airstream is enriched with oxygen to 40 mole % oxygen, the calculated adiabatic theoretical flame temperature should increase to about 3000° F. Again, if the airstream is enriched with oxygen, this time to 70 mole % oxygen, the calculated theoretical adiabatic flame temperature should increase to about 3350° F. However, most better quality firebrick and refractory material installed in Claus plant reaction furnaces are good for a maximum continuous operating temperature of only 2700°-2800° F., if they have an alumina content of 85-90 wt % or greater. In practice, it is prudent to maintain temperatures below the extreme limits to avoid refractory failure. Therefore it may be seen from the above calculations that only limited oxygen enrichment, 30 to 32 mole % oxygen of the airstream can be used and still hold temperatures below a maximum of 2800° F. With the small reduction of nitrogen input when increasing the airstream oxygen content from 21 up to 32 mole % oxygen, only a modest increase in Claus plant capacity is realized, approximately 12-15%.

The present invention, however, permits increasing the oxygen enrichment to above 32 mole % to increase capacity of an existing Claus sulfur recovery unit or a new sulfur recovery unit by injecting fluid sulfur, preferably at a temperature of 260° to 290° F., from the sulfur pit of the Claus plant into the reaction furnace zone to moderate the oxygen-enriched flame temperature or perform a pre-equilibrium quench, or alternatively, to quench reaction zone effluents by addition downstream of the reaction furnace combustion zone. In practice, the injection rate of sulfur would be set to provide dilution and cooling to control the reaction furnace temperature in the 2400°-2800° F. range. In one embodiment, the liquid sulfur is added independently into the burner of the reaction furnace. With this technique, hydrogen sulfide feed and sulfur recovery capacity can be increased by 50-100% by enriching the airstream to 70 mole% oxygen when handling 90 mole% hydrogen sulfide acid gas feed. By injecting a liquid sulfur stream under atomized or well dispersed conditions, the flame temperature associated with very high oxygen-enrichment which is necessary to effect significant throughput increases is moderated by the relatively cool injected sulfur. The liquid sulfur injection provides a moderating effect because the vaporization of the liquid sulfur and the heating and depolymerization of the vapor which takes place in the reaction furnace zone absorbs heat.

Note also, that at first glance it would appear that liquid sulfur could not be used to moderate flame temperature because sulfur itself is combustible with oxygen and burns to a high flame temperature. In the Claus process, however, after allowing for oxygen required to burn hydrocarbons in the hydrogen sulfide feed and for a minor fraction of the hydrogen sulfide feed that dissociates to hydrogen and sulfur at reaction furnace flame conditions, oxygen input is set by the overall reaction $$H_2S + \tfrac{1}{2}O_2 \rightarrow H_2O + S_1$$

stoichiometry requirements. Accordingly, to the extent that the limited oxygen injected burns sulfur, it will burn less hydrogen sulfide. Considering the heats of reaction for burning hydrogen sulfide or sulfur and the heat capacity of the excess reactants, the flame temperature is approximately the same whether hydrogen sulfide or sulfur is burned by the limited oxygen. Note also, that thermodynamic equilibrium is closely approached at the reaction furnaces outlet and it depends only on the input flows, compositions and temperatures and is independent of the reaction path. Therefore, the reaction furnace outlet temperature and composition is the same whether the oxygen burns hydrogen sulfide or sulfur.

Although liquid sulfur from the downstream portions of the Claus plant is the most desired source of a sulfur moderant or pre-equilibrium quench for the reaction furnace zone, other forms and sources of sulfur could work or be utilized in a similar manner. Therefore, sulfur from an individual condensation stage of the Claus plant could be utilized, rather than sulfur from the central collection pit. Alternatively, solid pulverized sulfur could be entrained in a carrier gas or slipstream from the acid gas feed to the reaction furnace and injected as the moderator or diluent. Such finely dispersed solid sulfur would have increased heat absorption capability over liquid sulfur. Of course, in referring to liquid sulfur, it is contemplated that such sulfur addition to the reaction furnace would be in a manner so that the sulfur is introduced as a fine atomized spray into the gases which are being comingled for combustion in the reaction furnace. Although the addition of sulfur for temperature moderation of the flame of the reaction zone is preferred to be conducted into the burner or into the burner flame through its own independent orifice, it is also contemplated that sulfur could be added to the acid gas feed stream prior to introduction to the burner of the reaction furnace. It is also possible to add the liquid sulfur to the oxidant stream introduced into the burner, such as the air, oxygen or oxygen-enriched airstream, but preignition of the resultant flammable mixture would have to be considered.

Alternatively, the sulfur can be injected downstream of the flame of the reaction zone and just upstream of the waste heat boiler to quench the reaction effluents to a relatively low temperature wherein reversibly formed reaction species are frozen in their dissociated state.

The combination of oxygen-enrichment and liquid sulfur injection provides an unexpected potential enhancement of capacity or throughput for a Claus plant. Particularly, the liquid sulfur provides an attractive alternative to other diluent components added to a reaction furnace in an oxygen-enrichment mode, because the sulfur is quickly removed in the first condenser downstream of the reaction furnace so as not to produce throughput limitations in the downstream equipment, which equipment further processes the partially reacted acid gas stream. The use of a liquid sulfur injection configuration can be provided as a retrofit to a capacity limited existing Claus plant system or it could be provided in a smaller size new installation taking into account the increased capacity freedom provided by the oxygen-enrichment and liquid sulfur injection.

Although it may appear that the addition of liquid sulfur to the reaction furnace would further aggravate capacity limitations in the Claus plant, in actuality, the avoidance of large quantities of nitrogen as a diluent by the removal of fractional or the entire quantity of air to the reaction furnace achieves significant capacity freedom both in the reaction furnace and the downstream catalytic converter. The local increase in material flow through the reaction furnace created by the injection of liquid sulfur is more than balanced off by the enhanced throughput through the downstream catalytic converters. This is because the injected liquid sulfur is readily removed in the first condensate downstream of the reaction furnace and is not a part of the process stream passing through the entire Claus plant train.

The Claus process proceeds by two sequential reaction steps. First:

$$H_2S + 3/2 O_2 \rightarrow H_2O + SO_2 \tag{1}$$

in a fast irreversible exothermic reaction of hydrogen sulfide and oxygen to produce water and sulfur dioxide. After the sulfur dioxide species is available to react with the remaining hydrogen sulfide, a second reaction as follows occurs:

$$2H_2S + SO_2 \rightleftharpoons 2H_2O + 1\tfrac{1}{2}S_2 \tag{2}$$

which is a relatively slow endothermic reversible reaction in which elemental sulfur is one of the products of the equilibrium reaction. The addition of sulfur to the reaction furnace would therefore appear to inhibit the overall Claus process reaction. This is true for the reaction furnace where an inhibition of sulfur conversion is exhibited as per Table 1 below. However, as can be seen from the various conversions in the catalytic conversion and condenser units downstream of the reaction furnace, in a typical Claus plant, the recovery in these subsequent conversions increases and largely offsets the initial inhibition. This is due to the fact that the moderating liquid sulfur diluent added to the reaction furnace is almost totally removed from the first condenser as sulfur condensate and does not interfere with the downstream catalytic conversion in the condensation zones. Because inerts are also decreased with the absence of nitrogen from air or water from water injection, the conversion under catalytic conditions is decidedly higher than would be with other Claus processes. This is true because at the operating temperature of the catalytic converters the sulfur formed polymerizes and there is a substantial decrease in moles of gas in the reaction. Consistent with Le Chatelier's principle: the equilibrium conversion for a decreased volume reaction should increase with reaction pressure. Effective reaction pressure at constant total pressure is increased because of the decrease in the inerts partial pressure compared to air operation or water injection. Therefore, the overall conversion is seen to decrease only slightly as per Table 1 below, while temperatures are moderated and capacity limitations are freed up. Also, decreased nitrogen flow results in sharply decreased tailgas flow, which will result in increased recovery in the tailgas cleanup unit.

Table 1 below compares several different modes of Claus plant operation wherein a 90% hydrogen sulfide rich stream is processed through a reaction furnace and three stages of catalytic conversion and condensation. The Table shows a base case wherein air is used resulting in acceptable outlet temperatures from the reaction furnace, but capacity limitations for the total throughput identified as back end flow rate are high. A second case is set forth wherein 100% oxygen enrichment is performed in which the capacity is greatly increased from the air case, but the temperatures exceed known limits for firebrick in reaction furnaces. A third case is set forth wherein oxygen enrichment is teamed up with water injection to provide temperature moderation and some capacity increase, but as noted in the back end flow rate specifications, the water injection suffers from a carry over of water vapor past the first condenser in the Claus flow train. The final case (present invention) is oxygen enrichment with liquid sulfur injection. It can be seen that this case provides similar temperature moderation from the high oxygen enrichment case as water injection, but also provides the greatest capacity freedom, which is identified by the back end flow rate in Table 1.

The values for net sulfur conversion are set forth in a cumulative manner. Specifically, conversion from the reaction furnace is for that first step of the Claus process. Conversion for the first converter is a total for the reaction furnace and the first converter. Conversion for the second converter is a total for the reaction furnace, the first converter and the second converter. Finally, conversion for the third converter is a total of the reaction furnace, the two proceeding converters and the third converter, so that the value for net sulfur conversion in the third converter constitutes the overall conversion for the process. A comparison of those values indicates that the oxygen enriched sulfur injection process of the present invention enjoys conversion comparable to the other modes, while at the same time providing the temperature moderation and capacity freedom identified above. This combination of total conversion, temperature moderation and capacity freedom constitutes the unexpected and surprising results of the present invention. One generally would not consider reintroducing product into a Claus process to improve the reaction when the desired result is high total conversion and capacity freedom in conjunction with temperature moderation. It would generally be presumed that the addition of sulfur to the Claus process would greatly inhibit the Claus process equilibrium so that an impaired overall reaction would occur. However, this has not been the case in the present invention wherein sulfur addition provides all of the desired attributes and does not significantly inhibit the overall sulfur conversion in the Claus process having a reaction furnace and one or more subsequent catalytic conversion stage.

TABLE 1

|  | BASE-CASE (AIR) | OXYGEN-ENRICHED (NO DILUENT) (100% $O_2$) | OXYGEN-ENRICHED (WITH WATER INJECTION) (100% $O_2$) | OXYGEN-ENRICHED (WITH S(L) INJECTION) (100% $O_2$) |
|---|---|---|---|---|
| REACTION FURNACE/WASTE HEAT BOILER/CONDENSER | | | | |
| FURNACE OUTLET TEMPERATURE, °F. | 2282 | 3590 | 2197 | 2274 |
| NET SULFUR CONVERSION, % | 69.9 | 77.06 | 59.95 | 52.6 |
| NET SULFUR CONDENSED, #/hr. | 8469 | 9330 | 7258 | 6363 |
| OXYGEN REQUIREMENTS, # mol/hr. | 190.9 | 192.1 | 180.2 | 180.7 |
| TOTAL FLOW ENTERING FURNACE, # mol/hr. | 1264.4 | 550 | 851.4 | 590.2 |
| BACK-END FLOW RATE, # mol/hr. | 1134.6 | 444 | 738.9 | 418.1 |
| FIRST CONVERTER/CONDENSER | | | | |
| INLET TEMPERATURE, °F. | 430 | 430 | 430 | 430 |
| OUTLET TEMPERATURE, °F. | 561 | 638 | 633 | 752 |
| NET SULFUR CONVERSION, % | 92.0 | 92.30 | 85.48 | 83.0 |
| NET SULFUR CONDENSED, #/hr | 11137 | 11176 | 10349 | 10051 |
| SECOND CONVERTER/CONDENSER | | | | |
| INLET TEMPERATURE, °F. | 420 | 420 | 420 | 420 |
| OUTLET TEMPERATURE, °F. | 449 | 496 | 500 | 574 |
| NET SULFUR CONVERSION, % | 96.6 | 97.30 | 94.29 | 94.0 |
| NET SULFUR CONDENSED, #/hr. | 11700 | 11779 | 11416 | 11383 |
| THIRD CONVERTER/CONDENSER | | | | |
| INLET TEMPERATURE, °F. | 400 | 400 | 400 | 400 |
| OUTLET TEMPERATURE, °F. | 406 | 422 | 425 | 455 |
| NET SULFUR CONVERSION, % | 98.12 | 98.82 | 97.27 | 97.83 |
| NET SULFUR CONDENSED, #/hr. | 11879 | 11964 | 11776 | 11844 |
| LIQUID INJECTION RATE, | | | | |
| # mol/hr | N/A | N/A | 273.3 | 184.7 (As $S_2$) |
| #/hr | | | 4923.2 | 11819 |
| DILUENT | NITROGEN | N/A | LIQUID WATER | LIQUID SULFUR (As $S_2$) |
| DILUENT TO OXYGEN FLOW RATIO, # MOL DILUENT/# MOL $O_2$ | 3.76 | N/A | 1.80 | 1.02 |

The amount of capacity increase provided by the process of the present invention in comparison to the techniques of the prior art with regard to Claus processing are shown in Table 2 below. In this Table the capacity increase for pressure drop limited operation for an air base case, a 100% oxygen enrichment case, an oxygen and water injection case and the oxygen and sulfur injection case of the present invention are set forth. The sulfur injection temperature moderation case shows a decided improvement over the water injection moderation operations wherein the capacity increase is 107.2%.

The pure oxygen enrichment case, although showing a high capacity increase, is unobtainable in light of the fact that refractory temperature limits are achieved well before 100% oxygen enrichment is instituted in feed gas streams having high hydrogen sulfide concentrations. The pressure drop values given in Table 2 indicate that for an air base case the greatest pressure drop exists in the catalytic train rather than the reaction furnace. The water injection mode of operation exhibits a similar distribution of pressure drop, whereas the sulfur injection mode of the present invention shows a shift of pressure drop from the catalytic portion of the train to the reaction furnace. This is due to the increased volume of material being passed through the reaction furnace in the form of liquid sulfur injection, but which is nearly fully condensed out in the first condensation zone, such that the additional flow is not experienced by the downstream catalytic train of the Claus process. All pressure drop values for the different modes equal a pressure drop of 11 psi but it should be understood that this is the mode of operation at different total flow capacities depending upon identified. Note also, this is based on an inlet Claus plant pressure of 29 psia. With 11 psi pressure drop for the Claus plant, inlet pressure to the Claus tail gas unit will be 18 psia allowing 3 psi pressure drop through the tail gas unit.

TABLE 2

CAPACITY INCREASE

| | Capacity Increase, % | Pressure Drop, psia | |
|---|---|---|---|
| | | Reaction Furnace | Catalytic Trn. |
| Air Base Case | 0.0 | 1.9 | 9.1 |
| Enriched Oxygen-No Recycle 100% O$_2$ | 150.5 | 3.4 | 7.6 |
| Enriched Oxygen-Water Injection 100% O$_2$ | 62.4 | 2.1 | 8.9 |
| Enriched Oxygen-Sulfur Injection 100% O$_2$ | 107.2 | 4.2 | 6.8 |

Figure 1:
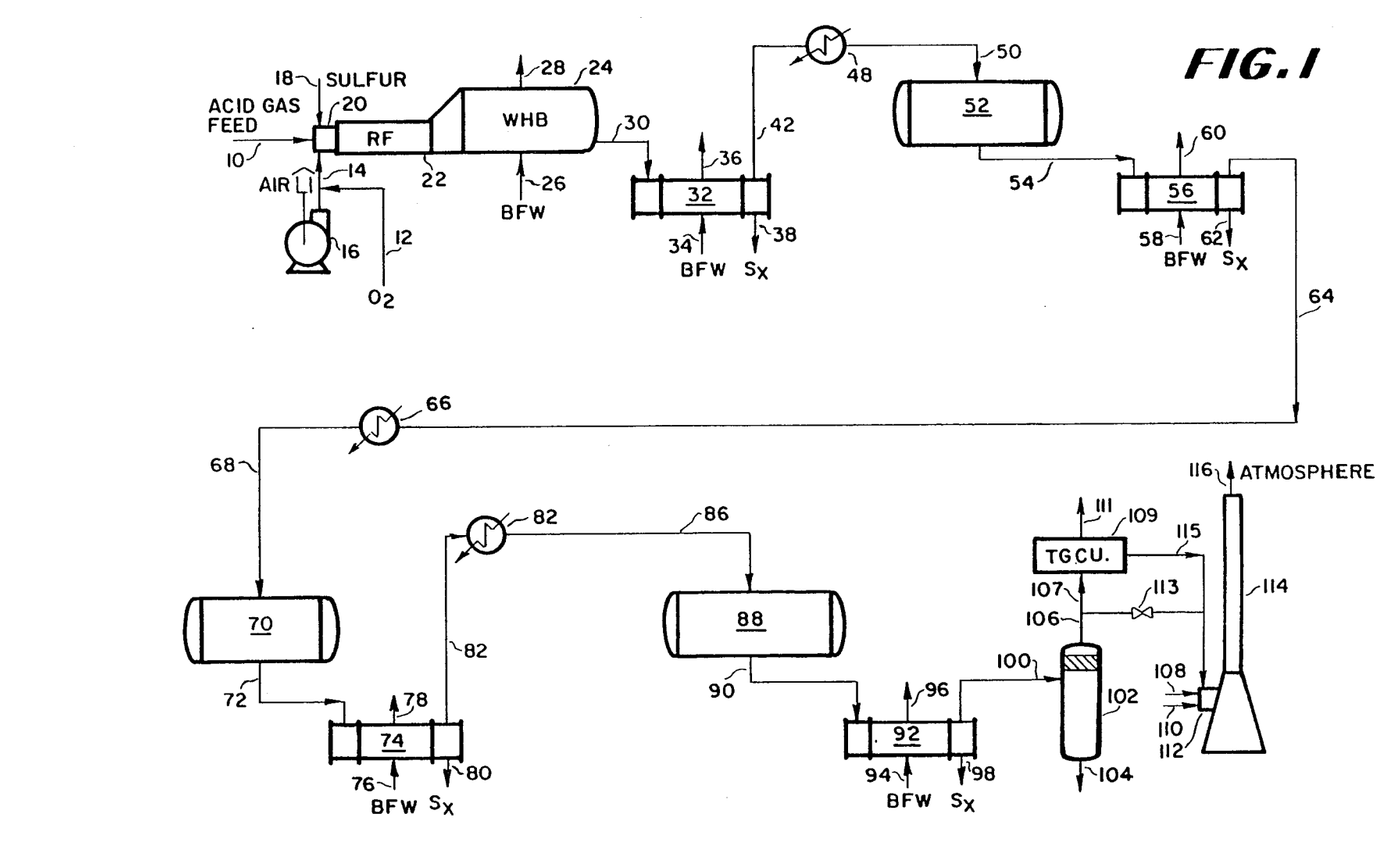
FIG. 1 is a schematic representation of the oxygen-enrichment and sulfur injection embodiment of a Claus plant using the present invention.

The first embodiment of the present invention will now be described in greater detail with reference to the embodiment which is illustrated in FIG. 1. An acid gas feed stream is introduced into the Claus system in line 10. The feed is at a temperature of 100° F. and a pressure of 29.5 psia. The acid gas stream is introduced into the burner 20 of the reaction furnace 22 to be combusted with, potentially, air in line 14 supplied from compressor 16, as well as oxygen in line 12, also introduced into the burner for the downstream combustion reaction. The oxygen can be mixed with the air or introduced separately into the reaction furnace zone. The oxygen can be of any desired purity, although preferably commercially pure oxygen is introduced into the system. It is understood that depending upon the total oxygen-enrichment required, it may be chosen to delete some or all the air introduced into the burner 20. In order to moderate the temperature of the oxygen-enriched combustion of the acid gas feed, liquid sulfur is introduced in line 18 directly into the burner 20. However, it is contemplated that the liquid sulfur addition could be made into the acid gas feed stream, or if temperature and flammability considerations were adequately controlled, into the oxidant stream of either air or oxygen. Of course, alternately as identified earlier, pulverized solid sulfur in a carrier gas could be used in replacement of the liquid sulfur of the preferred embodiment.

The amount of sulfur added, considering sulfur as S$_2$ with a molecular weight of 64.13, is in the range of up to 1.3 moles per moles of enriching oxygen fed to the system. Preferably the range of liquid sulfur addition is up to 1.02 moles of liquid sulfur per mole of enriching oxygen.

The reactants are combusted at burner 20 and evolve into the reaction furnace 22 where the endothermic reactions of the Claus process occur. Specifically in the burner, hydrogen sulfide and oxygen combine to produce sulfur dioxide and water, wherein approximately one third of the reaction feed is initially combusted and the remaining two thirds react with the sulfur dioxide produced to result in sulfur and water according the following formulas:

$$H_2S + 3/2 O_2 \rightarrow SO_2 + H_2O \quad (1)$$

$$2H_2S + SO_2 \rightarrow 3/2 S_2 + 2H_2O \quad (2)$$

giving the overall Claus reaction:

$$3H_2S + 3/2 O_2 \rightarrow 3H_2O + 3/2 S_2 \quad (3)$$

Some hydrogen is also produced by hydrogen sulfide disassociation, as follows:

$$2H_2S \rightleftharpoons 2H_2 + S_2 \quad (4)$$

$$CO_2 + H_2S \rightleftharpoons CO + H_2O + \tfrac{1}{2} S_2 \quad (5)$$

The reactor furnace effluent then passes through a circuitous heat exchange zone or waste heat boiler 24 wherein the combustion effluents are cooled against boiler feed water in line 26, which then produces steam in line 28. In the waste heat boiler 24, the reaction effluents are converted from one form of sulfur species to another ranging from S$_3$ to S$_8$. The major sulfur species are formed according to the following equations:

$$S_2 \rightarrow \tfrac{1}{3} S_6$$

$$S_2 \rightarrow \tfrac{1}{4} S_8$$

The cooled effluent is removed from the waste heat boiler in line 30 still at high temperature and at a pressure only slightly below the pressure of the feeds to the burner. The effluent is then introduced into the first condenser 32 wherein the effluent is again heat exchanged to cool the effluent against boiler feed water in line 34 which produces steam in line 36. Liquid sulfur is condensed out in line 38 and the gaseous combustion effluent stream is removed in line 42. The liquid sulfur in line 38 is generally removed to a central sulfur pit which collects sulfur from many condensation units. However, it can be contemplated that a portion of the sulfur from the condenser 32 in line 38 can be directly recycled to line 18 for injection to the reaction furnace. This is not shown and actually constitutes a less preferred embodiment. The most preferred embodiment is where the recycled sulfur in line 18 is recovered from the central sulfur pit, again not illustrated.

The effluent stream in line 42 is then reheated in a reheater heat exchanger 48 against process steam. The reheated stream now in line 50 has been reheated to a temperature sufficient for further reaction of the sulfur contained therein. such temperature being approximately 430° F. This stream is then introduced into a catalytic converter reactor 52 wherein additional quantities of hydrogen sulfide and sulfur dioxide are reacted to produce sulfur (primarily $S_6$ and $S_8$) and water according to the following equations:

$$2H_2S + SO_2 \rightarrow 3/6 S_6 + 2H_2O \quad (6)$$

$$2H_2S + SO_2 \rightarrow 3/8 S_8 + 2H_2O \quad (7)$$

The reacted stream now in line 54 is introduced into a second condenser 56 which again cools the effluent stream against boiler feed water in line 58 to produce additional steam in line 60. Additional elemental sulfur is recovered in line 62 in the liquid state wherein the sulfur species produced in the catalytic reaction are converted to high molecular weight sulfur species and are then condensed to elemental sulfur liquid.

The stream in line 64 is at a reduced temperature of approximately 348.5° F., which is below the desired temperature for additional catalytic reaction. Therefore, the stream is introduced into reheater heat exchanger 66 and heated against process steam to produce a feed stream in line 68 at a temperature sufficient for catalytic Claus reaction of approximately 420° F. This stream is introduced into a second catalytic converter 70 wherein a similar catalytic reaction between hydrogen sulfide and sulfur dioxide occurs with the catalytic effluent in line 72 going to yet another condenser 74, which is cooled with boiler feedwater 76 to produce steam in line 78. An additional quantity of liquid elemental sulfur is removed in line 80.

The effluent stream in line 82 is further reheated in reheater heat exchanger 84 to a temperature of 400° F. against process steam to produce a stream in line 86 at high temperature sufficient for a catalytic Claus reaction. This stream is introduced into the third and final catalytic reactor 88 to react substantially the remaining hydrogen sulfide and sulfur dioxide to produce sulfur species which are removed in line 90. That stream is introduced into a condenser 92 and cooled by boiler feedwater in line 94 producing steam in line 96. Further elemental sulfur in liquid form is removed in line 98 while the final effluent is recovered in line 100 comprising predominantly nitrogen, carbon dioxide, hydrogen and residual hydrogen sulfide and sulfur compounds.

The stream in line 100 is introduced into a tailgas coalescer 102 wherein additional sulfur mist is removed in line 104. The residual stream in line 106 can be sent to a tailgas clean-up unit 109 through line 107 or alternately, sent directly to an incinerator 114 by opening of valve 113. If the stream in line 106 is directed into the tailgas clean-up unit 109, it can be further processed for the removal of sulfur and the resulting effluent in line 111 can be recycled to the front end of the system to the acid gas feed in line 10. The cleaned-up inert gas stream can then be cycled through line 115 into an incinerator for venting to the atmosphere. The incinerator 114 is operated with a burner 112 supplied with air 108 and a fuel, such as natural gas, in line 110 to combust any residual amounts of sulfur from the tailgas unit or alternately from the coalescor 102. The resulting stream in line 116 should be environmentally acceptable and can be vented to atmosphere.

The above embodiment is exemplary of the present invention which incorporates oxygen enrichment and liquid sulfur recycle to provide; (1) an increased degree of freedom in oxygen enrichment levels, (2) an increase in the throughput for Claus plants, (3) a decrease in overall pressure drop through a Claus plant when the same capacity is utilized as prior to the injection of liquid sulfur, (4) a reduction in the effluent flow to and through the tailgas processing unit, (5) an equivalent or nearly equivalent percent recovery of sulfur from the feed gas stream, (6) a manageable negative effect by sulfur addition on the Claus equilibrium reaction which is compensated for in the downstream catalytic zones, (7) an improved and easier separation of the diluent to the reaction furnace downstream of the reaction furnace over that of diluent water wherein the lquid sulfur is easily condensed out at the first opportunity in the Claus plant train, and (8) increased residence time in the reaction furnace over that wherein other inerts are used to moderate temperature in light of the greater heat absorbing capacity of the liquid sulfur.

Figure 2:
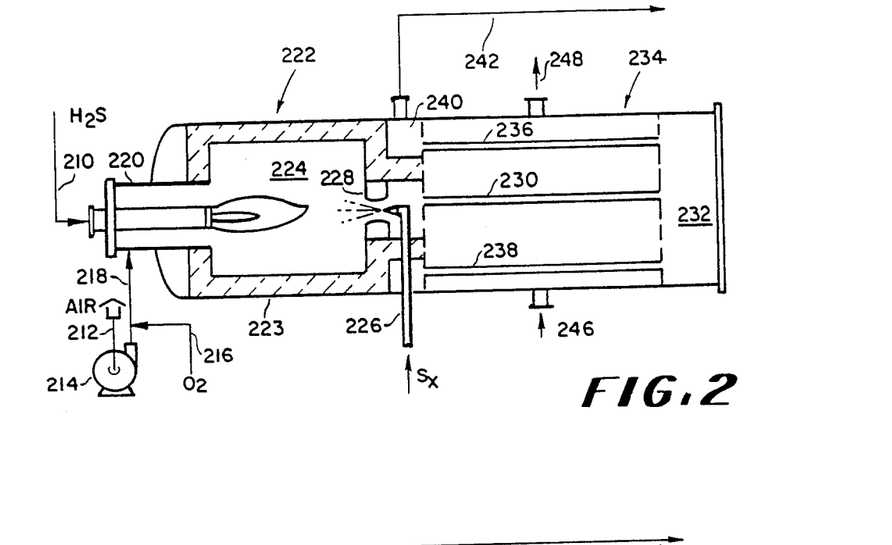
FIG. 2 is a partial schematic of an alternative embodiment of the present invention showing the reaction furnace and waste heat boiler of FIG. 1 in alternate form.
Figure 3:
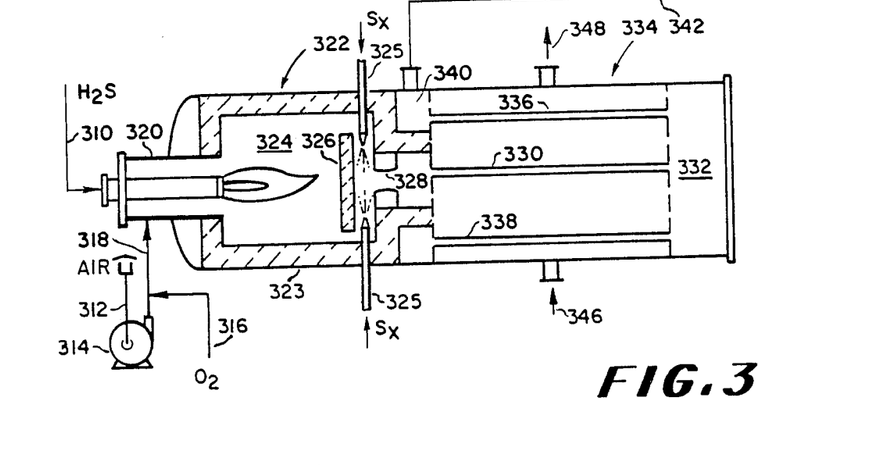
FIG. 3 is an alternative of the embodiment of FIG. 2.

With reference to the alternate illustrations of the reaction furnace of FIG. 1 shown in FIGS. 2 and 3, the alternative sulfur moderation of the Claus process of the present invention will presently be described. The previous embodiment of the present invention requires increased amounts of oxygen and fails to take advantage of inherent reactions of hydrogen sulfide (reactions (4) and (5) above) as will be more fully discussed below.

It is well known that thermodynamic equilibrium is closely approached in the reaction furnace or combustion zone effluent for essentially all species, except for minor quantities of carbon disulfide. At equilibrium, the following important reversible endothermic reactions, recited previously, which convert hydrogen sulfide to sulfur without utilizing oxygen also equilibrate:

$$H_2S \rightleftharpoons H_2 + \tfrac{1}{2}S_2 \quad (4)$$

$$CO_2 + H_2S \rightleftharpoons CO + H_2O + \tfrac{1}{2}S_2 \quad (5)$$

As stated above, these endothermic reactions (4) and (5) produce sulfur directly without the use of oxygen.

To the extent that they occur, reactions (4) and (5) reduce the requirement for oxygen for reactions (1) or (3). In addition, because they reduce the exothermic oxygen reaction and are themselves endothermic, they reduce the reaction furnace temperature levels when the oxygen input is set to give a 2:1 hydrogen sulfide to sulfur dioxide ratio in the combustion zone effluent. This endothermc reaction utilization of heat from the exothermic reactions decreases the overall temperature in the combustion zone of the reaction furnace by several hundred degrees Fahrenheit when rich feeds containing 60% hydrogen sulfide or greater are processed in the Claus process. The cooling is sufficient to keep combustion zone temperatures below the 2800° F. refractory temperature limit of typical linings in Claus plants even when oxygen enriched air feed is increased up to 100% oxygen utilization. As oxygen enrichment is increased and combustion zone temperatures increase, these endothermic reactions increase and their endotherm tends to moderate and brake the temperature rise induced by the exothermic reaction of hydrogen sulfide with oxygen.

It is fully recognized here that within the combustion zone, before complete thermodynamic equilibrium is reached, because of the relatively higher reaction rates for reactions (1) and (4S) in relation to the reactions (2), (3) and (5), the extent to which hydrogen sulfide has thermally dissociated would be greater than in the post-equilibrium zone. Therefore, quenching the reaction mixture before the reactions (2) and (3) had a chance to proceed to a significant extent as they are not as fast as the reactions (1) and (4), would further enhance hydrogen production and reduce oxygen consumption.

Other Claus processes do not take advantage of these endothermic reactions to produce sulfur from hydrogen sulfide. This is because these reactions are reversed to a significant extent during normal cool down of the combustion zone effluent in the reaction furnace waste heat boilers of the traditional Claus process plant. As a result, the hydrogen sulfide reformed by the reversal of reactions (4) and (5) increases the hydrogen sulfide/sulfur dioxide ratio above the desired 2:1. The previously stated remedy for this recombination of hydrogen sulfide was the increase of oxidant gas input to the combustion zone of the reaction furnace to increase the sulfur dioxide species formed from reaction (1) beyond the 2:1 ratio so that after combustion and reformation during the relatively slow cooling in the waste heat boiler of the Claus plant, the 2:1 ratio would prevail downstream after the effect of the partial reversal reactions (4) and (5). The increased oxidant gas input raised combustion zone temperatures in the reaction furnace to levels which would exceed refractory lining limitations of the materials in the reaction furnace when high oxygen content oxygen enriched air is used to obtain increased Claus process capacity.

The freezing of reactions (4) and (5) is utilized in hydrogenproducing processes operating with hydrogen sulfide feeds, wherein highly efficient indirect heat exchange is utilized or the injection of downstream reacted gases or external steam directly into the reaction furnace zone effluent gas is utilized to effect freezing of such reactions. From a commercial perspective, the fabrication and utilization of high efficiency heat exchangers to effect the rapid and deep quench cooling necessary to freeze reactions (4) and (5) is impractical. The alternate embodiment of the present invention preferably utilizes liquid sulfur to quench the reaction furnace zone gas stream quickly to a low temperature sufficient to freeze reactions (4) and (5) to avoid the release of heat that the reversal of those reactions would create and to preserve the sulfur produced by such reactions, while avoiding the increase in hydrogen sulfide species which would alter the desired 2:1 hydrogen sulfide/sulfur dioxide ratio needed for catalytic conversion in the Claus process. Alternately, vaporized sulfur can be utlized as the sulfur quench.

The result of injecting liquid sulfur into the reaction furnace downstream of the combustion zone and upstream of the waste heat boiler to quench the reaction furnace zone effluent to a temperature preferably in the approximate range of 1000° F. to 1700° F., preferably 1400° F., to freeze the reactions (4) and (5) provides several advantages. By producing sulfur from hydrogen sulfide at least in part without the utilization of oxygen, the preservation of these reversible reactions at an equilibrium displaced to the right reduces the quantity of oxygen necessary in reaction (1). It also reduces the requirements for the downstream catalytic Claus reactors. Surprisingly, the liquid sulfur injection also allows the process operation to avoid high temperatures in the reaction furnace and specifically the reaction furnace zone by reduction of the required oxygen to process a given quantity of hydrogen sulfide. The alternative embodiment of the present invention avoids the circumstance of potential high temperature conditions by allowing the reduction of oxygen fed to the reaction furnace and therefore the maintenance of lower combustion temperatures. In addition, by freezing these endothermic reactions at equilibriums far to the right of the equations, the exothermic heat of allowing the reactions to reverse is additionally avoided.

As pointed out earlier, further advantage may be gained if the reaction furnace zone reactions are quenched before complete thermodynamic equilibrium is attained, in that the higher speed of the reaction (4) is beneficially exploited by quenching in the active reaction zone where dissociation of hydrogen sulfide has occurred to its maximum and before the reaction (4) begins to reverse.

The addition of liquid sulfur downstream of the combustion or flame of the reaction furnace and upstream of the waste heat boiler of a Claus process does not aggravate the velocity pressure drop or equilibrium sulfur conversion constraints in the downstream catalytic Claus reaction trains because the injected sulfur is easily and readily removed from the process flow stream by condensation in the first condensation stage where sulfur is removed. This contrasts with the utilization of other diluents which are not readily removed by condensation, such as reacted gas or external steam. The addition of liquid sulfur downstream of the combustion or flame of the reaction furnace and upstream of the waste heat boiler differs in its effect from the addition of liquid sulfur as a possible diluent to the flame zone of the reaction furnace itself as in the first embodiment of the present invention. When liquid sulfur is added to the flame zone of the reaction furnace, particularly through the burner of the reaction furnace, the liquid sulfur acts as a diluent to reduce the high temperature provided by the oxygen fed combustion. It does nothing to prevent undesirable reverse reactions during cooling in the waste heat boiler. In the present embodiment, liquid sulfur is not added to the combustion or flame zone of the reaction furnace or through the burner of the flame, but rather is introduced downstream of the reaction furnace flame zone at an orifice between the reaction furnace and the waste heat boiler wherein only the products of the combustion are contacted with liquid sulfur to freeze the reaction products of at least the reversible reactions to preserve the conversion products of sulfur produced from the cracking or disassociation of hydrogen sulfide. In this way, it is critical that the liquid sulfur is added at a specific site and not merely that liquid sulfur is added as a temperature moderant. Therefore, substantial differing results and effects are achieved by the careful addition of liquid sulfur between the combustion zone and the waste heat boiler in contrast to adding it through the burner to the flame zone of the reaction furnace. This difference is most notably apparent in the external requirements of oxygen fed to the reaction furnace for the conversion of hydrogen sulfide to sulfur. When liquid sulfur is added to the flame zone of the reaction furnace as a temperature moderant, oxygen requirements will remain high so as to convert additional hydrogen sulfide to sulfur dioxide in order to balance the expected recombination of sulfur and hydrogen to hydrogen sulfide and the recombination of carbon monoxide, water and sulfur to carbon dioxide and hydrogen sulfide when reactions (4) and (5) occur downstream from such a liquid sulfur injected Claus process. Oxygen requirements will be lowered significantly by the addition of liquid sulfur downstream of the flame zone between the combustion zone of the reaction furnace and the waste heat boiler, as set forth in this alternative embodiment of the present invention. Therefore, the introduction of liquid sulfur in a Claus process between the combustion zone of a reaction furnace and the waste heat boiler downstream of the reaction furnace provides the advantage of reduced oxygen consumption, lower resulting combustion zone temperatures and freedom in velocity constraints in the downstream catalytic Claus reaction trains.

The advantages of the alternative embodiment of the present invention will now be set forth with reference to computer simulated examples that demonstrate the effects of the invention on a 75% hydrogen sulfide Claus plant feed.

puter simulation of the Claus process. When the effluent entering the waste heat boiler is controlled to achieve a 2:1 ratio of hydrogen sulfide to sulfur dioxide in the waste heat boiler effluent for efficient recovery of sulfur by reaction (2) in the downstream catalytic Claus conversion zones, the oxygen requirement in the combustion zone of the reaction furnace is 0.49 moles per mole of hydrogen sulfide feed. The reaction furnace temperature would be 3019° F., which is unacceptably high for the typical temperature restraints of refractory linings presently available in the state of the art. While 37% of

TABLE 3

|  | ACID GAS FEED | OXYGEN | REACTION FURNACE EFFLUENT | PRIMARY CUT-OFF | SECONDARY CUT-OFF |
|---|---|---|---|---|---|
| Pressure, PSIA | 25 | 25 | 25 | 25 | 25 |
| Temperature, Deg. F | 120 | 200 | 3019 | 2000 | 1600 |
| Vap. Density, lb/cu ft | 0.14 | 0.11 | 0.02 | 0.03 | 0.04 |
| Ave. Mol Wt | 35.31 | 32.00 | 32.90 | 34.78 | 35.14 |
| Flow Rates, moles/hr |  |  |  |  |  |
| Hydrogen Sulfide | 74.58 | — | 6.75 | 15.66 | 18.39 |
| Steam | 5.00 | — | 57.24 | 61.10 | 61.10 |
| Carbon Dioxide | 20.22 | — | 9.29 | 18.47 | 18.47 |
| Methane | 0.12 | — | — | — | — |
| Heptane | 0.08 | — | — | — | — |
| Nitrogen | 0.01 | — | 0.01 | 0.01 | 0.01 |
| Oxygen | — | 36.69 | — | — | — |
| Sulfur Dioxide | — | — | 15.71 | 9.19 | 9.19 |
| S2 | — | — | 25.97 | 24.78 | 23.40 |
| S6 | — | — | — | — | 0.006 |
| S7 | — | — | — | — | >0.01 |
| S8 | — | — | — | — | — |
| Hydrogen | — | — | 16.44 | 3.67 | 0.94 |
| Carbon Monoxide | — | — | 11.42 | 2.24 | 2.24 |
| Carbonyl Sulfide | — | — | 0.17 | 0.17 | 0.17 |
| Total Flow, |  |  |  |  |  |
| mol/hr | 100.01 | 36.69 | 143.00 | 135.29 | 133.91 |
| lb/hr | 3531.10 | 1174.04 | 4705.08 | 4705.08 | 4705.08 |
| Actual CFM | 414.71 | 173.14 | 3558.42 | 2380.38 | 1972.96 |

TABLE 4

|  | ACID GAS FEED | OXYGEN | REACTION FURNACE EFFLUENT |
|---|---|---|---|
| Pressure, PSIA | 25 | 25 | 25 |
| Temperature, Deg. F | 120 | 200 | 2511 |
| Vap. Density, lb/cu ft | 0.14 | 0.11 | 0.26 |
| Ave. Mol Wt | 35.31 | 32.00 | 32.83 |
| Flow Rates, moles/hr |  |  |  |
| Hydrogen Sulfide | 74.58 | — | 13.15 |
| Steam | 5.00 | — | 55.68 |
| Carbon Dioxide | 20.22 | — | 12.36 |
| Methane | 0.12 | — | — |
| Heptane | 0.08 | — | — |
| Nitrogen | 0.01 | — | 0.01 |
| Oxygen | — | 28.49 | — |
| Sulfur Dioxide | — | — | 6.75 |
| S2 | — | — | 27.18 |
| Hydrogen | — | — | 11.60 |
| Carbon Monoxide | — | — | 8.20 |
| Carbonyl Sulfide | — | — | 0.32 |
| Carbon Disulfide | — | — | 0.002 |
| Total Flow, |  |  |  |
| mol/hr | 100.01 | 28.49 | 135.17 |
| lb/hr | 3531.10 | 911.51 | 4437.54 |
| Actual CFM | 414.71 | 134.42 | 2872.38 |

Table 3 shows the conventional operation of Claus process with 100% oxygen wherein the relatively slow reversible reactions (2) and (5) equilibrate to a primary cut-off freeze temperature at 2000° F. The faster reaction (4) reverses to a secondary equilibrium cut-off freeze temperature of 1600° F. The previously referenced papers by Lees and Ryan describe the use of primary and secondary cut-off temperatures in comthe hydrogen sulfide is reacted to sulfur in the reaction furnace by reactions (4) and (5) as indicated by the hydrogen and the carbon monoxide make in Table 3, only 4.3% of the hydrogen sulfide conversion by these reactions is retained after the reaction reversals on typical cooling in the waste heat boiler at typical time periods for such cooling. The sulfur recovery is 63% of the sulfur introduced into the reaction furnace. Examination of the reaction furnace effluent stream shows that the hydrogen sulfide to sulfur dioxide ratio of 0.43 is required in the reaction furnace to achieve the 2:1 hydrogen sulfide to sulfur dioxide ratio at the downstream end of the waste heat boiler, as required for high conversions in the downstream catalytic Claus conversion zones. It should be understood that representative primary and secondary cut-off temperatures will vary from the 2000° F. and 1600° F. of this example depending on the heat transfer and velocity and gas residence time characteristics of the Claus waste heat boiler.

Note also that the first catalytic Claus converter stage downstream may be operated at a relatively high temperature and may use a special catalyst to hydrolyze the minor amount of carbonyl sulfide to hydrogen sulfide. This will raise the H2S:SO2 ratio above 2:1 and require a minor adjustment in the oxygen flow to restore the 2:1 ratio in downstream catalytic Claus converters for efficient sulfur conversion.

Table 4 presents the preferred liquid sulfur quench-freeze mode of operation of the present invention wherein liquid sulfur is injected to quench the reaction furnace combustion zone effluent to approximately 1400° F. (where the reverse reaction rates for reactions (2), (4) and (5) are negligible) essentially instantaneously. With both the combustion zone effluent as well as the waste heat boiler effluent, hydrogen sulfide to sulfur dioxide ratios again at the desired 2:1 ratio, 26.5% of the hydrogen sulfide is reacted to sulfur by reactions (4) and (5) as indicated by the hydrogen and carbon monoxide make. This conversion is frozen and retained for downstream catalytic conversion by the utilization of the quench liquid sulfur addition. The oxygen requirement for the combustion zone to achieve the conversion of hydrogen sulfide to sulfur dioxide according to reaction (1) is as a result reduced to 0.38 moles per mole of hydrogen sulfide feed and the combustion zone temperature in the reaction furnace is reduced to an acceptable 2511° F. By freezing the reversible reactions (4) and (5) the increased hydrogen and carbon monoxide content of the effluent gas will be utilized within the Claus process in the downstream reducing gas requirements of the tail gas cleanup unit. Sulfur conversion in this mode of operation of the present invention is increased to 73% for the reaction furnace step involving the combustion zone and the waste heat boiler. This increased conversion will decrease the load on the catalytic Claus converter stages of the downstream train and result in improved overall sulfur recovery and decreased emissions.

The alternative embodiment of the present invention will now be described in greater detail with reference to FIG. 2 wherein the only change from FIG. 1 is in the reaction furnace zone. The drawing represents an oxygen enriched Claus combustion process, which does not produce a hydrogen product for export, although hydrogen is formed which can be used internally in the tail gas cleanup of the Claus process. A hydrogen sulfide rich feed having a hydrogen sulfide content of 60% or greater is introduced into a reaction furnace 222 through line 210. The reaction furnace is lined with refractory brick 223. Air can be introduced in line 212 through blower 214. Preferably, commercially pure oxygen is introduced in line 216 to oxygen enrich the combustion that will occur in the reaction furnace 222. The oxygen 216 can be mixed with air or added to the burner separately. The total oxygen content of the combustion gas 218 can range from 21% up to 100% oxygen. The feed gas in line 210 and the combustion gas in line 218 are introduced into a burner 220 wherein the hydrogen sulfide is combusted and converted in a combustion or flame zone 224 by way of reactions (1) and (2), as well as being cracked by reactions (4) and (5). The temperature in the combustion or flame zone 224 is in the range of 1800° to 2700° F. The oxygen is added in the form of air, oxygen-enriched air or commercially pure oxygen to provide a hydrogen sulfide to oxygen volume ratio in the range of 1.9:1 to 2.9:1. The combustion of hydrogen sulfide and conversion by the Claus reaction results in a combustion zone effluent having a hydrogen sulfide to sulfur dioxide ratio in the range of 1.95:1 to 2.05:1. This combustion zone effluent is then passed through a ceramic venturi 228 wherein the effluent is mixed with liquid sulfur introduced in spray nozzle 226 to cool and instantaneously quench the reaction furnace zone effluent downstream of the combustion or flame zone 224 and upstream of the waste heat boiler 234 to a temperature in the range of 1000° to 1700° F. The effluent is quenched by the direct introduction of the liquid sulfur as a spray which mixes, intermingles and evaporates endothermically in a dispersed manner with the combustion zone effluent to freeze the reversible reactions (2), (4) and (5). This quenching inhibits the reformation of hydrogen sulfide and maintains the hydrogen sulfide to sulfur dioxide ratio of the reaction furnace effluent as it enters the inlet of the waste heat boiler 234. The quenched effluent is further cooled by indirect heat exchange in a waste heat boiler 234 against a cooling fluid, such as boiler feed water introduced in line 246 and removed as steam in line 248.

The reaction furnace zone effluent, after quench-cooling, passes through the primary heat exchange tubes such as 230 for initial cooling in the waste heat boiler 234 and enters a plenum 232 wherein the partially cooled effluent gases are then directed in reverse manner back through the secondary heat exchange tubes 236 and 238 to an annular collection zone 240. The cooled reaction furnace zone effluent and vaporized injected sulfur in line 242 is then removed to a first sulfur condenser and downstream Claus catalytic reaction train as described for the first embodiment of the present invention and illustrated in FIG. 1.

Although the sulfur quench is preferably provided as a liquid phase, the sulfur quench could be vaporized at temperatures above its boiling point of 832° F. and still be effective for quench if the quench rate is increased about 40% when quenching to 1400° F. If sulfur vapor is used for quench, the injection system would be similar to that of FIG. 2. but the injection would not be cooled and appropriate materials would be required. In sum, fluid sulfur, liquid or vapor, can be used for quench.

FIG. 3 shows an alternate mode of the sulfur quench addition of FIG. 2. A hydrogen-sulfide feed 310 and air 312 compressed in compressor 314, oxygen 316 and supplied as a combined stream 318 are supplied to a burner 320 of a reaction furnace 322. The combustion or flame zone 324 is encased in a refractory brick lining 323. The quench sulfur is supplied through a plurality of sulfur nozzles 325 which dispense sulfur into the combustion or reaction effluent behind a radiation shield 326. The quenched gases then pass through venturi 338, waste heat boiler 334, including passage 330, plenum 332, reverse passages 336 and 338, and collection zone 340 before passing in line 342 to the downstream processing illustrated in FIG. 1. The effluent is cooled against boiler feed water in line 346 which leaves the boiler 334 at an elevated temperature in line 348.

The present alternative embodiment has been set forth with regard to specific computer simulated examples, as well as a preferred mode of operation set forth in FIG. 2 and 3. However, the present alternative embodiment can be operated over a range of conditions. For example the hydrogen sulfide feed stream processed would typically be above 60% hydrogen sulfide, but is possibly in the range of 60–100 mole % hydrogen sulfide, preferably 80–90% hydrogen sulfide. The oxygen content of the combustion gas is typically above 21 mole % but is preferably in the range of 32–100 mole %. The liquid sulfur utilized to perform the quench cooling step is added in the range of 12 to 30 lbs/lb mole of reaction furnace effluent but is preferably added at approximately 17 lbs/lb mole of reaction furnace effluent. The oxygen is added in an amount and a manner to maintain a preferred hydrogen sulfide to sulfur dioxide ratio which is beneficial to the Claus reaction for the production of sulfur from hydrogen sulfide wherein the hydrogen sulfide to sulfur dioxide ratio is in the range of 1.95 to 2.05:1 and optimally is in a ratio of 2:1. This results in a combustion or flame zone temperature of 1800° F. to 2700° F., preferably a temperature of approximately 2400° F. When the liquid sulfur addition is added in the above recited range, it results in a quench temperature of the combustion zone effluent in the range of 1000°–1700° F., Although the first embodiment of FIG. 1 and the alternative embodiments of FIG. 2 and 3 have been described separately, with hydrogen sulfide feeds having a concentration of 90% or greater it may also be advantageous to add a moderant directly into the combustion or flame zone as well as adding a quench medium to the reaction effluent. Typically a recycle gas, water or sulfur can be added per FIG. 1 while fluid sulfur is added per FIG. 2 or 3.

The present invention has been described with regard to several preferred embodiments, those skilled in the art will be capable of contemplating other variants which are deemed to be within the scope of the invention, which scope should be ascertained from the claims which follow.

We claim:

1. In a process for recovering sulfur from a feed gas containing 60 mole % or greater of hydrogen sulfide wherein the gas stream is partially combusted with an oxygen-enriched gas in a Claus reaction furnace zone, a combustion effluent is cooled with the attendant condensation separation of sulfur in a condensation zone and the remaining effluent stream is further treated, the improvement comprising introducing a temperature moderating stream of fluid sulfur into the reaction furnace zone to moderate the temperature of the oxygen enriched reaction furnace zone.

2. The process of claim 1 wherein the fluid sulfur is added to the reaction furnace zone downstream of the combustion or flame zone and upstream of the waste heat boiler so as to quench the reaction furnace effluent.

3. The process of claim 1 wherein the oxygen-enriched gas has an oxygen content of 32 to 100 mole %.

4. The process of claim 1 wherein the injected liquid sulfur constitutes up to 1.3 moles of sulfur per mole of enriching oxygen.

5. The process of claim 1 wherein the injected liquid sulfur is in the range of 0.8–1.3 moles of sulfur per mole of enriching oxygen.

6. The process of claim 1 wherein the temperature of the reaction furnace zone is in the range of 2400°–2800° F.

7. A process for recovering sulfur from a feed stream having a hydrogen sulfide content greater than 60% in an oxygen enriched Claus combustion conversion, comprising the steps of:
  (a) combusting the hydrogen sulfide feed gas with an oxygen enriched gas in a reaction furnace zone, wherein the hydrogen sulfide/oxygen volume ratio is in the range of 1.9:1 to 2.9:1 and the temperature of the reaction furnace zone is in the range of 1800° to 2700° F., to produce a reaction furnace effluent with a hydrogen sulfide/sulfur dioxide ratio in the range of 1.95:1 to 2.05:1;
  (b) rapidly direct quenching the reaction furnace effluent to cool said effluent to a temperature in the range of 1000° to 1700° F. to inhibit the reformation of hydrogen sulfide and to maintain the hydrogen sulfide/sulfur dioxide ratio of the combustion effluent by introducing a stream of fluid sulfur into said effluent at the inlet of a waste heat boiler;
  (c) indirectly heat exchanging the reaction furnace effluent against a cooling fluid to further reduce the temperature of the reaction furnace effluent in a waste heat boiler;
  (d) condensing liquid sulfur and recovering the same from the reaction furnace effluent in a first condensation zone by further cooling the reaction furnace effluent to the condensation temperature of sulfur against a cooling fluid; and
  (e) passing the remaining reaction furnace effluent through additional processing to recover sulfur.

8. The process of claim 7 wherein the hydrogen sulfide content of the feed stream is in the range of 60 to 100 mole percent.

9. The process of claim 7 wherein the hydrogen sulfide/oxygen ratio is approximately 2.5:1.

10. The process of claim 7 wherein the hydrogen sulfide to sulfur dioxide ratio is 2.

11. The process of claim 7 wherein the combustion zone is at a temperature of approximately 2400° F.

12. The process of claim 7 wherein the quenched combustion zone effluent is at a temperature of approximately 1400° F.

13. The process of claim 7 wherein the fluid sulfur is added in a ratio to the combustion zone effluent of approximately 17 lbs/lb mole of effluent.

* * * * *